United States Patent [19]

Sharma

[11] 4,441,946

[45] Apr. 10, 1984

[54] HEAT AND HUMIDITY RESISTANT STEEL CORD REINFORCED RUBBER COMPOSITE

[75] Inventor: Satish C. Sharma, Mogadore, Ohio

[73] Assignee: The General Tire & Rubber Company, Akron, Ohio

[21] Appl. No.: 443,253

[22] Filed: Nov. 22, 1982

Related U.S. Application Data

[63] Continuation of Ser. No. 260,234, May 4, 1981, abandoned.

[51] Int. Cl.³ .............................................. B29M 5/02
[52] U.S. Cl. .................................. 156/307.3; 152/359; 156/307.7; 156/331.5; 156/335; 428/391; 428/447; 428/450; 524/509; 156/910
[58] Field of Search ....................... 428/447, 450, 391; 152/359; 156/110 A, 335, 307.3, 307.7.331.5; 260/4 R, 42.32, 42.33, 735; 525/343, 535; 524/509

[56] References Cited

U.S. PATENT DOCUMENTS 3,088,847 5/1963 Pines ..................................... 428/450
4,052,524 10/1977 Harakas et al. ...................... 428/250

Primary Examiner—James J. Bell

[57] ABSTRACT

Humid aged adhesion of rubber containing a phenol formaldehyde resin bonded directly to bright steel cord is improved by coating the bright steel cord with an amino functional organo silane.

3 Claims, No Drawings

HEAT AND HUMIDITY RESISTANT STEEL CORD REINFORCED RUBBER COMPOSITE

This is a continuation of application Ser. No. 260,234 filed May 4, 1981, now abandoned.

The invention relates to vulcanized rubber reinforced with bright steel cord.

The problem of corrosion of bright steel wire and the consequent loss of adhesion between steel wire and rubber in steel wire reinforced tires is well-known. A considerable amount of effort has been devoted towards the understanding of the mechanism(s) of corrosion and adhesion loss. Based on the results of the above studies, some progress has been made in solving this problem using the approach of modifying the rubber stocks and/or brass plating. One approach to the solution to the corrosion problem of steel reinforcement in tires is described in U.S. Pat. No. 4,052,524 Harakas 1977. Harakas found that if one first cleaned the steel reinforcing wire with acid or base, followed by a water rinse, coated the reinforcing wire with amino alkyl silane, then resorcinol formaldehyde latex (RFL) and then embedded the coated wire in rubber, the hydrolytic stability of the composite was improved. The adhesion recited in the Harakas patent, however, may well have been due to the resorcinol formaldehyde resin employed.

The problem with the Harakas invention is that the steel reinforcing wire must first be cleaned then coated with an amino silane and then coated with a resin latex before it is incorporated into the rubber. Along the same lines, see U.S. Pat. No. 4,236,564 Kalafus et al. 1980, which teaches that a phenolformaldehyde coating on the bright steel cord provides protection of the bond from heat and humidity degradation. U.S. Pat. No. 3,088,847 (Pines 1963) broadly discloses treating metal surfaces with specific amino functional organo silanes to improve initial adhesion.

The present invention solves the problem of the multi-step Harakas method and improves the humid aged adhesion of the bright steel cord to rubber. The present invention is directed to first coating uncleaned bright steel cord with an amino functional organo silane then incorporating the cord directly without a resin coating into a specifically formulated phenolic resin and silica containing rubber. By an amino functional organo silane is meant a silane having silicon bonded hydrolyzable groups such as lower alkoxy, and in addition, an amino functional organic group. By amino functionality organic group is meant an organic group which has at least one amino functionality and is bonded to the silicon by a silicon-carbon bond. The preferred amino functional organo silane is N-$\beta$-(N-vinylbenzylamino)ethyl-$\gamma$-aminopropyl-tri-methoxysilane monohydrogen chloride.

In the following examples, the amino functional organo silane coated cord was prepared by dipping bright steel cord in a water or alcohol solution of the silane. All dips were prepared by mixing together appropriate amounts of n-propanol and water and then adding the required amount of silane coupling agents to give a solution containing 1–5% (by weight) of silane. The most often used concentration was 2% by weight. The dip pH adjustment (when needed) was done with 0.1 N NaOH or glacial acetic acid. All dips were aged for at least one hour (at room temperature) before use. The following silanes were employed.

| Silanes | |
|---|---|
| A-1100 | $\gamma$-Aminopropyltriethoxysilane (Union Carbide) |
| A-1120 | N—$\beta$-(Aminoethyl)-$\gamma$-Aminopropyltrimethoxysilane (Union Carbide) |
| Z-6020 | N—$\beta$-(Aminoethyl)-$\gamma$-aminopropyltrimethoxysilane (Dow Corning) |
| Z-6026 | Aminoalkyltrimethoxysilane + polyol (Dow Corning) |
| Z-6032 | N—$\beta$-(N—vinylbenzylamino)ethyl-$\gamma$-aminopropyltrimethoxysilane monohydrogen chloride (Dow Corning) |

The following rubber compound was used in the first set of examples.

| Ingredients | Parts |
|---|---|
| Natural Rubber | 46.50 |
| SBR-1551[1] | 38.50 |
| Polybutadiene | 15.00 |
| Endor Peptizer[2] | 0.14 |
| FEF Black | 45.00 |
| Hi-Sil 215[3] | 15.00 |
| BLE[4] | 2.00 |
| Aromatic Oil | 5.00 |
| Zinc Oxide | 3.00 |
| Stearic Acid | 1.50 |
| Arofene 8318[5] | 1.50 |
| Cohedur RL[6] | 4.70 |
| Santocure NS[7] | 1.20 |
| Crystex Sulfur[8] | 3.00 |

[1]Emulsion copolymerized styrene-butadiene rubber
[2]Activated zinc salt of pentachlorothiophenol
[3]Precipitated hydrated amorphous silica
[4]High-temperature reaction product of diphenylamine and acetone
[5]Octylphenol formaldehyde, non-heat reactive
[6]Equal parts of resorcinol and hexamethylol melamine pentamethyl ether with a small amount of dibutyl phthalate for viscosity control
[7]N—t-butyl-2-benzothiazolesulfenamide
[8]20% oil-treated crystex, polymerized sulfur A 1×5×0.25 mm construction bright steel cord obtained from Bekaert Steel Wire Corporation was used in these studies. As controls, brass-plated steel cords of 1×5×0.25 mm construction obtained from Bekaert Steel Wire Corporation and from National Standard Company were used.

All cord processing was done on a dipping unit consisting of a dip tank and a curing oven. The oven temperature ranged between 90°–225° C. The temperature was monitored at three points along the oven (two ends and the middle) and is reported as such. Processing times varied between 60–180 seconds, giving cord processing rates of 1–3 meters/minute.

Cord pullout adhesion test (similar to ASTM D-2229) was used exclusively in these studies. In this test, cord is embedded in 12.7 mm ($\frac{1}{2}$ in.) rubber block and the force required to pull the cord out of rubber is recorded. Eight or sixteen pulls were generally averaged to give the adhesion values reported. The test (crosshead) speed was 12.7 cm (5 in.) per minute.

The cord-rubber adhesion samples were cured at 153° C. for 35 minutes and stored at room temperatures for at least 16 hours before testing.

To evaluate the effect of humid aging on adhesion, the adhesion samples were placed in a cylinder containing 100 ml of deionized water and sealed. Humid aging was carried out by placing the cylinder in an oven maintained at 121° C. After the desired aging period, the samples were removed from the cylinder, allowed to equilibrate to room temperature (approximately one hour) and tested for adhesion as mentioned above.

The adhesion data for bright steel cords treated with silanes of various amine functionalities are given in with Z-6032 silane), therefore, may perform better than the brass-plated cords in steel cord-rubber composites.

TABLE II
ADHESION OF SILANE TREATED BRIGHT STEEL CORDS TO RUBBER
EFFECT OF LONG-TERM HUMID AGING

| Silane Indentification | Dip pH | Unaged Adhesion (Newtons) | Humid Aged Adhesion | | |
|---|---|---|---|---|---|
| | | | 121° C./H$_2$O + Air/ 16 hrs. (Newtons) | 121° C./H$_2$O + Air/ 72 hrs. (Newtons) | 121° C./H$_2$O + Air/ 168 hrs. (Newtons) |
| A-1100 | 11.0 | 317 | 256 | 208 | 127 |
| Z-6026 | 10.0 | 341 | 285 | 229 | 155 |
| A-1120 | 11.0 | 332 | 249 | 211 | 150 |
| Z-6020 | 11.0 | 325 | 265 | 200 | 142 |
| Z-6032 | 7.4 | 363 | 380 | 356 | 266 |
| National Standard Brass-Plated Cord (Control) | | 420 | 211 | 54 | 46 |

The silane concentration of the dips was 2%.
Cord Processing Conditions: 140°-155°-175° C., 2 minutes.

Table I. The data show that the unaged adhesions for the various silane treated cords are essentially equivalent to that of the Bekaert brass-plated cord and some even approach that of the National Standard brass-plated cord. The humid aged adhesions for the silane treated cords are considerably higher than that of the brass-plated (Bekaert or National Standard) control cords. Of particular significance are the adhesion values obtained for the bright steel cords treated with Dow Corning's Z-6032 silane at dip pH of 7.4.

The data in Table I also show that no significant advantage (if any at all) is seen in adjusting the pH of the silane dip to 4.5 as recommended by Dow Corning. All the aminofunctional silanes, therefore, can be used by simply diluting the as-received materials in appropriate water+n-propanol mixtures.

TABLE I
ADHESION OF SILANE TREATED BRIGHT STEEL CORDS TO RUBBER
EFFECT OF VARIOUS AMINE FUNCTIONALITIES

| Silane Indentification | Silane Functionality | Dip pH | Wire Pullout Adhesion | |
|---|---|---|---|---|
| | | | Unaged Adhesion (Newtons) | Humid Aged Adhesion (121° C./H$_2$O + Air/16 hrs.) |
| A-1100 (Union Carbide) | Amino | 11.0* | 359 | 258 |
| Z-6026 (Dow Corning) | Amino | 10.0* | 339 | 284 |
| | | 4.5 | 370 | 225 |
| A-1120 (Union Carbide) | Diamino | 11.0* | 351 | 245 |
| Z-6020 (Dow Corning) | Diamino | 11.0* | 388 | 219 |
| | | 4.5 | 393 | 185 |
| Z-6032 (Dow Corning) | Vinylbenzylamine HCl | 7.4* | 410 | 296 |
| | | 4.5 | 315 | 345 |
| Beakert brass-plated wire (control) | — | | 352 | 170 |
| National Standard brass-plated wire (control) | — | | 410 | 170 |

*pH of the 2% silane solution in 15% water and 83% n-propanol (i.e. no pH adjustment was needed).
Cord processing conditions: 140°-155°-175° C., 2 minutes.

The performance of the aminosilane treated bright steel cord was further compared with the brass-plated cord in long-term in-rubber humid aged adhesion test. The corresponding data are given in Table II. The unaged adhesions for these silane treated cords are 5%–10% lower than the values obtained earlier for the corresponding cords (see Table I) and are only 75%–90% of those for the brass-plated control cord. In the humid aging test, however, the brass-plated cord loses adhesion rapidly but the silane treated cords show much higher adhesions. Once again the steel cords treated with Dow Corning's Z-6032 silane stand out in humid aged adhesion retention-showing essentially no loss of adhesion after humid aging for 72 hours (the brass-plated cord loses 87% of its adhesion during this time). The silane treated cords (especially those treated The rubber compound used in the studies reported so far contains bonding agents Hi-Sil and Cohedur RL. It was, therefore, of interest to see what role, if any, these bonding agents played in the bonding of aminosilane treated wires to rubber. The recipes for the rubber compounds with and without bonding agents are as follows.

| | FORMULATIONS for TABLE III DATA | | | |
|---|---|---|---|---|
| Ingredients | 1 | 2 | 4 | 3 |
| Natural Rubber | 46.50 | 46.50 | 46.50 | 46.50 |
| SBR-1551 | 38.50 | 38.50 | 38.50 | 38.50 |
| Polybutadiene | 15.00 | 15.00 | 15.00 | 15.00 |
| Endor Peptizer[1] | 0.14 | 0.14 | 0.14 | 0.14 |
| FEF Black | 45.00 | 45.00 | 60.00 | 45.00 |
| HAF Black | — | 15.00 | — | 15.00 |
| Hi-Sil 215[2] | 15.00 | — | — | 15.00 |
| BLE[3] | 2.00 | 2.00 | 2.00 | 2.00 |
| Aromatic Oil | 5.00 | 10.00 | 5.00 | 10.00 |
| Zinc Oxide | 3.00 | 3.00 | 3.00 | 3.00 |
| Stearic Acid | 1.50 | 1.50 | 1.50 | 1.50 |
| Arofene 8318[4] | 1.50 | 1.50 | 1.50 | 1.50 |
| Cohedur RL[5] | 4.70 | 4.70 | — | — |
| Retarder W[6] | — | — | 1.00 | 1.00 |
| Santocure NS[7] | 1.20 | 1.20 | 1.20 | 1.20 |

-continued

| FORMULATIONS for TABLE III DATA | | | | |
|---|---|---|---|---|
| Ingredients | 1 | 2 | 4 | 3 |
| Crystex Sulfur[8] | 3.00 | 2.50 | 2.0 | 2.50 |

[1]Activated zinc salt of pentachlorothiophenol
[2]Precipitated hydrated amorphous silica
[3]High-temperature reaction product of diphenylamine and acetone
[4]Octylphenol formaldehyde, non-heat reactive
[5]Equal parts of resorcinol and hexamethylol melamine pentamethyl ether with a small amount of dibutyl phthalate for viscosity control
[6]Salicylic acid
[7]N—t-butyl-2-benzothiazolesulfenamide
[8]20% oil-treated crystex, polymerized sulfur While the curing characteristics and the properties of the cured compounds are not identical, they are close enough to enable a meaningful evaluation of the effect of bonding agents on the adhesion of silane treated wires to rubber.

The adhesion data for the rubber compounds with and without bonding agents are given in Table III.

TABLE III

ADHESION OF AMINOSILANE TREATED BRIGHT STEEL CORDS TO RUBBER
EFFECT OF BONDING AGENTS

| Compound | Bonding Agents | Silane Identification | Dip pH | Wire Pullout Adhesion | |
|---|---|---|---|---|---|
| | | | | Unaged Adhesion (Newtons) | Humid Aged Adhesion (121° C./H$_2$O + Air/16 hrs.) (Newtons) |
| 1 | Hi-Sil | A-1100 | 11.0 | 305 | 233 |
| | + | A-1120 | 11.0 | 314 | 243 |
| | Cohedur RL | Z-6020 | 11.0 | 276 | 239 |
| | | Z-6026 | 10.0 | 295 | 304 |
| | | Z-6032 | 7.4 | 303 | 320 |
| 2 | Cohedur RL | A-1100 | 11.0 | 207 | 150 |
| | | A-1120 | 11.0 | 230 | 192 |
| | | Z-6020 | 11.0 | 215 | 173 |
| | | Z-6026 | 10.0 | 225 | 167 |
| | | Z-6032 | 7.4 | 211 | 266 |
| 3 | Hi-Sil | A-1100 | 11.0 | 125 | 90 |
| | | A-1120 | 11.0 | 45 | 100 |
| | | Z-6020 | 11.0 | 51 | 92 |
| | | Z-6026 | 10.0 | 43 | 69 |
| | | Z-6032 | 7.4 | 97 | 68 |
| 4 | None | A-1100 | 11.0 | 46 | 72 |
| | | A-1120 | 11.0 | 49 | 63 |
| | | Z-6020 | 11.0 | 51 | 43 |
| | | Z-6026 | 10.0 | 43 | 45 |
| | | Z-6032 | 7.4 | 47 | 65 |

Cord Processing Conditions: 140°-155°-175° C., 2 minutes

The data show that the compound containing both Hi-Sil and Cohedur RL gave the highest adhesions. The compound containing Cohedur RL only also gave adequate adhesions. However, the adhesions for the compound containing only Hi-Sil as the bonding agent were essentially the same as those for the compound containing no bonding agents. There is thus an indication that perhaps the interactions between Cohedur RL in the rubber compound and the aminosilanes on the wire are responsible for the bonding of aminosilane treated wires to rubber. The differences in the adhesion values for the compounds containing Cohedur RL+Hi-Sil and that containing only Cohedur RL may, at least partly, be due to differences in the curing characteristics and/or the properties (e.g. tear strength) of the two compounds.

It has been demonstrated that the bright steel cords treated with the various aminosilane coupling agents adhere very well to the rubber compounds containing Cohedur RL and Hi-Sil. The unaged adhesions of the aminosilane treated wire were found to be equivalent to that of the Bekaert brass-plated wire and somewhat lower than that of the National Standard brass-plated wire. The humid aged adhesions for the silane treated wires were, however, found to be considerably better than that of the brass-plated wires.

Dip pickup of the silane onto the cords was very small indicating a molecular thickness of the silane on the cord was sufficient. The amount of dip pickup is small but effective.

I claim:

1. A method of bonding bright steel cord to an unvulcanized vulcanizable rubber which comprises coating said cord, said cord being free of acid or base surface treatment prior to coating, with an amino functional organo silane wherein said vulcanizable rubber contains a resorcinol and hexamethyol melamine bonding agent, a hydrated silica and other conventional rubber compounding ingredients, combining said coated bright steel cord and said unvulcanized vulcanizable rubber to form a composite and vulcanizing said composite.

2. The method of claim 1 wherein the amino functional organo silane is N-β-(N-vinylbenzylamino) ethyl-γ-aminopropyl-trimethoxysilane monohydrogen chloride.

3. The method of claim 1 wherein the bonding agent is a mixture of equal parts of resorcinol and hexamethyol melamine pentamethyl ether.

* * * * *